Figure 4:
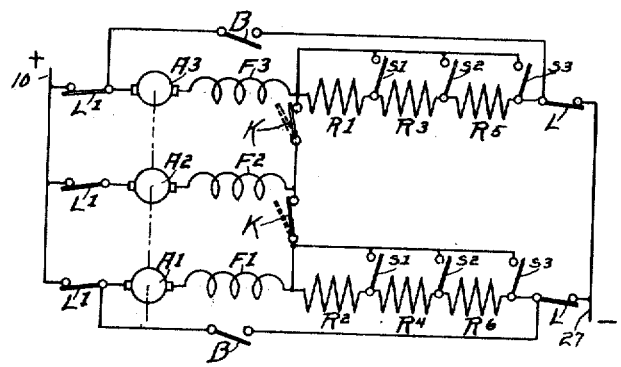

R. I. WRIGHT.
MOTOR CONTROL SYSTEM.
APPLICATION FILED APR. 18, 1917.
1,274,489.
Patented Aug. 6, 1918.
2 SHEETS—SHEET 1.
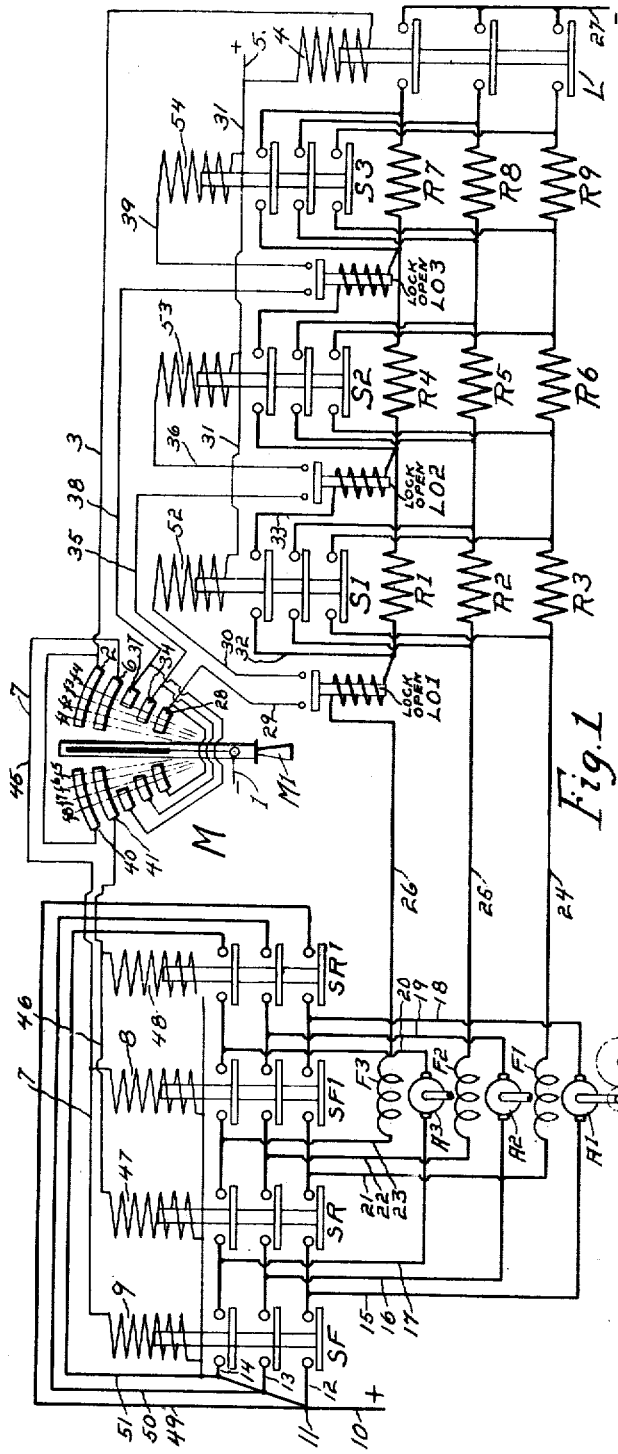
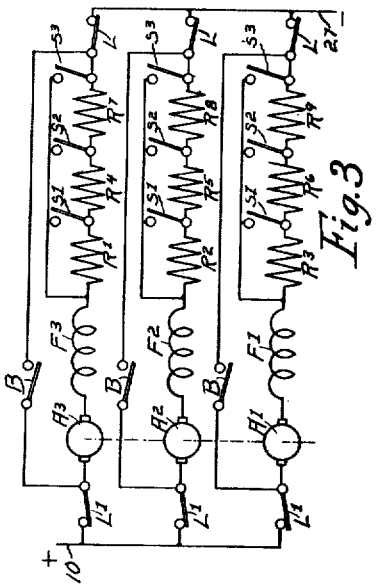
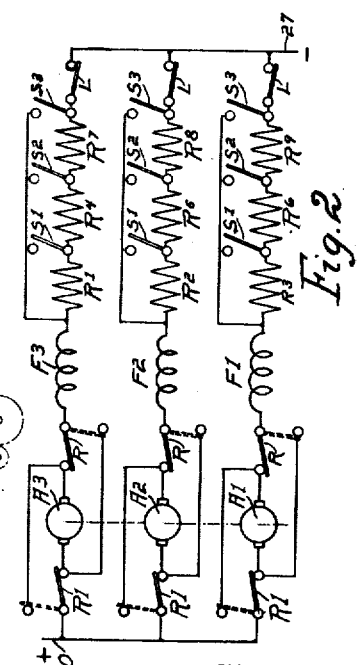
INVENTOR
Reuben I. Wright
BY
F. N. Barber
ATTORNEY.

R. I. WRIGHT.
MOTOR CONTROL SYSTEM.
APPLICATION FILED APR. 18, 1917.

1,274,489.

Patented Aug. 6, 1918.
2 SHEETS—SHEET 2.

INVENTOR.
Reuben I. Wright.
BY
G. N. Barber
ATTORNEY.

UNITED STATES PATENT OFFICE.

REUBEN I. WRIGHT, OF WICKLIFFE-ON-THE-LAKE, OHIO, ASSIGNOR TO THE ELECTRIC CONTROLLER & MANUFACTURING COMPANY, OF CLEVELAND, OHIO, A CORPORATION OF OHIO.

MOTOR-CONTROL SYSTEM.

1,274,489.  Specification of Letters Patent.  Patented Aug. 6, 1918.

Application filed April 18, 1917. Serial No. 162,891.

*To all whom it may concern:*

Be it known that I, REUBEN I. WRIGHT, a citizen of the United States, residing at Wickliffe-on-the-Lake, in the county of Cuyahoga and State of Ohio, have invented new and useful Improvements in Motor-Control Systems, of which the following is a specification.

This invention relates to motor control systems, and particularly to motor control systems in which two or more motors are mechanically connected to the same load.

When two or more motors (particularly series motors) which are mechanically connected to the same load and electrically connected in parallel are quickly reversed by reversing their line connections while the motors are running, or stopped by dynamic braking, it frequently occurs that large, dangerous or destructive circulating currents set up in the local circuits of the associated motors. This is due to the unavoidable electro-magnetic and the physical enequalities of the several motors employed, and various attempts have been made to overcome the undesirable effects of these inequalities by specially designing the motor control systems.

Heretofore, control systems designed to obviate these circulating currents which occur on rapid reversal or dynamic braking have introduced other disadvantages. For instance, one type of such system, using series motors, segregates the fields of the motors from their parallel connected armatures; this type effectually eradicates or satisfactorily reduces the circulating current, but tends to unbalance the field excitations and hence to unequalize the motor load. The obvious system is to equip each motor with an entirely separate controller, but this introduces prohibitive cost, complexity, inconvenience, and uncoördinated operation of the several motors.

In my improved motor control system, the advantages of using a separate controller for each motor are obtained without the attending disadvantages above mentioned. To eradicate the local circulating currents both upon rapid reversal and upon dynamic braking, I divide up the resistance of the accelerating rheostat among the motors and connect it to them in such manner that if the circulating current tends to set up, it will be limited by the resistance to a safe amount. In each motor, of which any number may be employed, I directly associate the armature with its own field, thus giving the best possible load balance. I so arrange the accelerating switches in the system that the divided rheostat resistance of all the motors is controlled by a single set of switches; and the same resistance and switches may be used both for accelerating and for dynamic braking.

Figure 5:
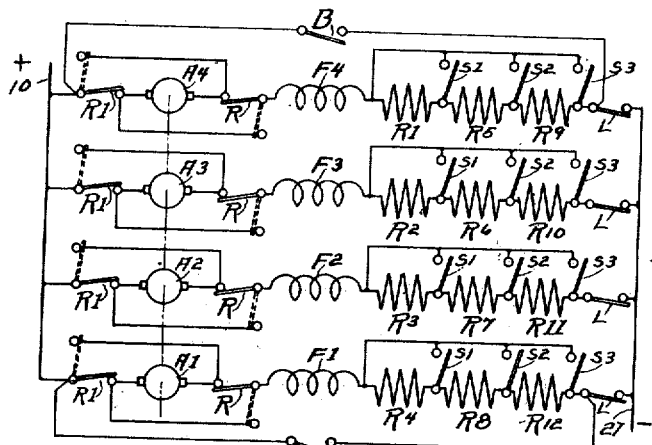

In the drawings, Figure 1 shows a motor control system embodying my invention when applied to three series motors arranged to be accelerated in one direction, rapidly reversed and accelerated in the other direction. Fig. 2 is a simplified diagram showing a form of my invention similar to Fig. 1; Fig. 3 is a diagram also in simplified form, but showing my invention applied to three series motors arranged to be accelerated and then stopped by dynamic braking; Fig. 4, a simplified diagram similar to Fig. 3, but employing only two banks of resistance; Fig. 5, a simplified diagram showing four reversing motors with dynamic braking connections for two of them; and Fig. 6, a diagram similar to Fig. 5, but employing only three banks of resistance.

Referring to Fig. 1, I have shown at $A^1$, $A^2$, $A^3$ the motor armatures, at $F^1$, $F^2$, $F^3$ their series fields. The armatures $A^1$, $A^2$, $A^3$ are mechanically connected to the same load, as indicated in the diagram. $R^1$ to $R^9$ inclusive are sections of starting resistance. SF, $SF^1$, SR, $SR^1$ are shunt wound reversing switches, the switches SF and $SF^1$ closing together to give current to the motor armatures in one direction to drive them forward, and the switches SR, $SR^1$ closing together after the switches SF and $SF^1$ have been opened to give current to the motor armatures in the reverse direction to drive them backward. $S^1$, $S^2$, $S^3$ are shunt wound contactors for short-circuiting the sections of resistance $R^1$ to $R^9$ to accelerate the motors. L is a shunt wound main line switch. At M is shown a master controller, preferably manually operated. By manipulating the master arm $M^1$ of the master controller, the various operations of the system may be controlled at will.

The "lock-open" relays $LO^1$, $LO^2$, $LO^3$ are series wound, that is, their windings are energized by motor current. Each of these switches has the peculiar characteristic of remaining in its normal, or open, position when the current in its winding is above a predetermined value, and of closing when the current is below, or is lowered to a point below, the predetermined value. Any suitable form of such "lock-open" switch may be used, but I prefer to use that form shown in my application, Serial Number 604,331, filed January 24, 1911, or in patent to Eastwood, No. 1,040,292, of October 8, 1912.

The operation of my invention as shown in Fig. 1 will now be explained in detail. With the master handle $M^1$ in the position shown, all the switches are in their normal, or open, positions shown, their windings being deënergized. To start and accelerate the motors in the forward direction, the master arm $M^1$ is first moved to the position $f^1$. Control current then flows from the negative supply wire 1 on the master controller, through the master arm, the contact 2, the wire 3, and the coil 4 of the line switch L, to the positive supply wire 5, closing the switch L. Current also flows from the negative on the master controller to the contact 6, and thence by the wire 7, and the coils 8 and 9 of the forward switches SF and $SF^1$, to the positive supply main 10, energizing and closing the forward reversing switches. When the switches L, SF and $SF^1$ have closed, main current flows from the positive supply main 10 to the point 11, where it divides, taking three separate paths, by way of the wires 12, 13, and 14, the contacts of the switch SF, and the wires 15, 16, and 17, to the motor armatures $A^1$, $A^2$, $A^3$, respectively, and thence by the wires 18, 19, and 20, the contacts of the switch $SF^1$, and the wires 21, 22, 23 to the fields $F^1$, $F^2$, $F^3$. From the field $F^1$ the current flows by the wire 24, the resistance sections $R^3$, $R^6$ and $R^9$, and the contacts of the switch L to the negative supply main 27; from the field $F^2$ the current flows by the wire 25, the resistance sections $R^2$, $R^5$, $R^8$, and the contacts of the switch L to the negative; and from the field $F^3$ the current flows by the wire 26, the coil of the lock-open relay $LO^1$, the resistance sections $R^1$, $R^4$, and $R^7$, and the contacts of the switch L to the negative supply main 27.

The motors are thus energized, the armature and the series field of each being in series with three sections of starting resistance across the supply mains. The current which first flows through the motor armature $A^3$, the field $F^3$, the wire 26, and the coil of the relay $LO^1$ locks that relay open. As the motor accelerates, the current falls to the value for which the relay $LO^1$ is set to close, and it closes. If now the master arm be moved to the position $f^2$, the control current will flow from the negative supply wire 1 on the master controller, through the master arm, the contact 28, the wire 29, the contacts of the relay $LO^1$, the wire 30, the coil 52, the contactor $S^1$, and the wire 31 to the positive supply wire 5, energizing and closing the contactor $S^1$. When the contactor $S^1$ closes, it short-circuits on its contacts the resistance sections $R^1$, $R^2$, $R^3$, that is, one section in the circuit of each motor. The short-circuiting of the section $R^1$ causes the current in the wire 26 to flow through the coil of the relay $LO^1$, the wire 32, the contacts of the contactor $S^1$, the wire 33, the coil of the relay $LO^2$, and the resistance sections $R^4$, $R^5$ to the negative main 27. The peak of current resulting from the short-circuiting of the resistance section $R^1$ is sufficient to lock open the relay $LO^2$. When the current falls to the value for which the relay $LO^2$ is set to close, it closes, and, if the master arm be now moved to the position $f^3$, current will flow from the negative on the master controller through the master arm, the contact 34, the wire 35, the contacts of the relay $LO^2$, the wire 36, the coil 53 of the contactor $S^2$, and the wire 31 to the positive wire 5. The current in this circuit energizes and closes the contactor $S^2$, and, as in the case of the contactor $S^1$, short-circuits a section of resistance in each motor circuit, namely the resistance sections $R^4$, $R^5$, $R^6$, and, brings into the circuit the winding of the relay $LO^3$, which is locked open by the rush of current due to the cutting out of the resistance sections $R^4$, $R^5$, $R^6$. When the current falls to the value for which the relay $LO^3$ is set, it closes, and, if the master arm be moved to the position $f^4$, the current will flow from the contact 37, the wire 38, the contacts of the relay $LO^3$, the wire 39, and the coil 54 of the contactor $S^3$ to the positive wire 5, closing the contactor $S^3$ and short-circuiting the resistance sections $R^7$, $R^8$, $R^9$. The resistance is now all cut out, and the motors run at full speed in the forward direction.

By moving the master arm point by point, as above described, the time of the closure of the contactors $S^1$, $S^2$, $S^3$ may be delayed at will. By moving the master arm at once to the full-on position $f^4$, the contactors $S^1$, $S^2$, $S^3$ will close in succession under the automatic current-limit control of the lock-open relays $LO^1$, $LO^2$, $LO^3$, and automatically bring the motors up to speed. By moving the master arm backward toward the off position, any one or all of the contactors $S^3$, $S^2$, $S^1$ may be opened, reinserting the resistance sections to reduce the speed of the motors.

With the motors running in the forward direction, as above described, if it be desired quickly to reverse their direction, the master arm is first moved to the off position shown in the drawing, whereupon all of the shunt-wound switches and contactors open, deënergizing the motors and opening the lock-open relays. The master arm is then moved into the position $f^5$. Control current will now flow from the negative wire 1 on the master controller, through the master arm, the contact 40, the wires 45 and 3, and the coil 4 of the switch L to the positive supply wire 5, closing the switch L, as before. Current will also flow through the master arm, the contact 41, the wire 46, and the coils 47 and 48 of the backward reversing switches SR and $SR^1$ to the positive supply main 10, closing the reversing switches SR and $SR^1$. Motor current will now flow to the motors from the positive supply main 10, dividing into three paths at 11 and flowing by way of the wires 49, 50, 51, the contacts of the reversing switch $SR^1$, the wires 18, 19, 20, the motor armatures $A^1$, $A^2$, $A^3$, the wires 15, 16, 17, the contacts of the switch SR, the wires 21, 22, 23, the series fields $F^1$, $F^2$, $F^3$, the wires 24, 25, and 26, the coil of the lock-open relay $LO^1$, the resistance sections $R^1$ to $R^9$, and the contacts of the switch L to the negative supply main 27. The current flows through the fields in the same direction as before, but in the reverse direction through the armatures. The armatures, therefore, slow down in the forward direction and stop and then begin to rotate in the reverse direction. During this reversal, there is a tendency for local current to flow from one motor to another, but in my improved control system herein described, by the placing of a portion of the starting resistance directly in series with each of the motors, this circulating current, if it tends to flow, will be reduced to a safe amount by the resistance. For example, the path of such a circulating current between the armatures $A^1$ and $A^2$, would be from the armature $A^2$ through the wire 19, the middle contacts of the switch $SR^1$, the wires 50 and 49, the lower contacts of the switch $SR^1$, the armature $A^1$, the wire 15, the lower contacts of the switch SR, the wire 21, the field $F^1$, the wire 24, the resistance sections $R^3$, $R^6$, $R^9$, the lower contacts of the switch L, the wire 27, the middle contacts of the switch L, the resistance sections $R^8$, $R^5$, $R^2$, the wire 25, the field $F^2$, the wire 22, the middle contacts of the switch SR, and the wire 16 back to the armature $A^2$; but this circulating current would be reduced to a safe amount by the resistances $R^3$, $R^6$, $R^9$, $R^8$ $R^5$, $R^2$ in series. Circulating currents between any other two of the motors would likewise be made safe.

When the motors have come to rest and have started to rotate in the opposite, or backward, direction, the accelerating contactors $S^1$, $S^2$, $S^3$ close automatically in succession, upon the automatic closure of the lock-open relays $LO^1$, $LO^2$, $LO^3$, or, close successively upon the movement of the master arm successively into positions $f^6$, $f^7$, $f^8$.

It will be noted that one set of accelerating contactors, $S^1$, $S^2$, $S^3$ is employed to control simultaneously resistance sections for all of the motors; that the armature and series field of each individual motor are in pure series relation with each other, so that each motor is properly energized to take its share of the load; and that, as above pointed out, local circulating currents are rendered safe.

The operation of my invention shown in Fig. 1, is more simply shown in connection with the simplified diagram shown by Fig. 2. The line switch L is shown in three parts; similarly, the accelerating contactors $S^1$, $S^2$, $S^3$ are each shown in three parts. A reversing switch R and a reversing switch RR, each in three parts, has two positions, one shown in solid lines and the other in dotted lines, for forward and for backward running. It is to be understood that all the switch elements having the same reference characters are parts of one switch and occupy the same positions at the same time. To start the motors in the forward direction, the switches R and RR are first moved to the solid line positions, and then the switches L are closed. Current then flows from the positive main 10 to the negative main 27 through three similar parallel circuits, each containing an armature, a field, and three resistance sections in series. The contactors $S^1$, $S^2$, $S^3$ are then successively closed to cut out the resistance sections and accelerate the motors. To stop and reverse the motors, all the switches are first opened, and then the switches R and RR are moved to their dotted line positions and the switches L are closed. The circuits thus established are the same as before, except that the current flows in the opposite direction through the armatures $A^1$, $A^2$, $A^3$. These changes of the switches stop the motors and start them in the opposite direction. The contactors $S^1$, $S^2$, $S^3$ are again successively closed to accelerate the motors. If desired, the switches L may be omitted. In this case, the motor current being interrupted by opening the reversing switches R and RR, the resistance sections $R^7$, $R^8$, and $R^9$ would be connected directly to the negative main 27.

In the simplified diagram shown in Fig. 3, I have illustrated my invention applied to the purpose of preventing circulating currents between any two of the motors when they are stopped by dynamic braking. As in Fig. 2, all switch elements bearing the same reference characters are parts of one switch and occupy the same positions at the same time. To start and accelerate the motors, the switches B and the contactors $S^1$, $S^2$, and $S^3$ are opened, and the switches L and L¹ are closed and the switches B¹ closed in the solid line position. Motor current then flows from the positive main 10 to the negative main 27 through three similar parallel circuits, each containing a motor armature, a series field, and three sections of resistance in series. The contactors S¹, S², S³ are then successively closed to short-circuit the resistance sections, whereby the motors are brought up to full speed. To stop the motors by dynamic braking, the switches L, L¹, the contactors S¹, S², S³ are first opened and then the switches B are closed and the switches B¹ thrown to the dotted line position. This gives a dynamic braking circuit for each motor electrically isolated from that of each other motor, each braking circuit consisting of an armature, its series field, and three sections of resistance in series. The braking current of the armature A³, for example, flows from the armature A³ through the series field F³, and the resistance sections R¹, R⁴, R⁷, the wire 50, and the switch B back to the motor armature A³. The dynamic braking circuit for each of the other two motors is similar. As the motors slow down, the contactors S¹, S², S³ are closed successively, cutting out the resistance sections to maintain the braking effect. When the motors have finally stopped, they may be started again by opening the contactors S¹, S², S³ to reinsert the starting resistance, and opening the switches B and closing the switches L and L¹ and the switches B¹ in the solid line position. If desired the switches L may be omitted, the current supply being broken on the switches L¹, and the resistance sections R⁷, R⁸ and R⁹ being connected directly to the negative main 27.

In the form of my invention shown on Fig. 4, three motors and two banks of resistance sections are employed, one bank consisting of the sections R¹, R³, R⁵, and the other of the sections R², R⁴, R⁶. All three of the mechanically connected motors are energized for acceleration, but only two are used for dynamic braking. All switches bearing the same reference characters are parts of the same switch, and occupy the same positions at the same time. To start the motors, the contactors S¹, S², S³ and B are opened and the switches L and L¹ are closed, and the switches B¹ are closed in the solid line position. Current then flows from the positive main 10 to the negative main 27 through the three motors and their fields in parallel, and then through the two resistance banks in parallel. The accelerating contactors S¹, S², S³ are closed successively, cutting out the resistance sections, whereby the motors are brought up to full speed. Each contactor cuts out two sections simultaneously; for example, the contactor S¹ cuts out the sections R¹ and R². To stop the motors by dynamic braking, the switches L and L¹, and the contactors S¹, S², S³ are opened, and the switches B are closed and the switches B¹ are closed in the dotted line position. This segregates the middle motor and its field from the other motors, each of which has an isolated dynamic braking circuit comprising its armature, its series field, and one of the resistance banks in series therewith. The contactors are closed successively to cut out the resistance and maintain the braking effect. The switches K may be employed, and when open will segregate the middle motor from the others for dynamic braking, in which case the switches L may be omitted, and the resistance sections R⁵ and R⁶ connected directly to the negative main 27.

In the form of my invention shown in Fig. 5, four motors with reversing connections are employed with a bank of resistance for each motor, and with dynamic braking connections for two motors. To start the motors, the switches B and the contactors S¹, S², S³ are opened and the switches L are closed, and the reversing switches R and RR are closed to the solid line positions, for example. As the motors start, the contactors S¹, S², S³ close successively to cut out the resistance sections to bring the motors up to speed, each contactor cutting out four sections of resistance simultaneously, one from each bank; as, for example, the contactor S¹ cuts out the sections R¹, R², R³ and R⁴. To reverse the motors, the contactors S¹, S², S³ are opened, and the switches R and RR are moved to the dotted line positions, the motor armatures then receiving current in the opposite direction, which stops them and then starts them in the other direction. The contactors S¹, S², S³ are then closed successively to accelerate the motors in the other direction. To stop the motors by dynamic braking, the switches L and the contactors S¹, S², and S³ are opened, and the switches B are closed, and the switches R and RR are thrown to the reverse or dotted line position, thus giving for each of the two outside motors an isolated dynamic braking circuit including an armature, a series field, and a resistance bank in series therewith. The contactors are then closed successively to cut out the resistance to maintain the braking effect. If desired, the switches L may be omitted; in this case the motor current may be interrupted by opening the reversing switches R and RR, and the resistance sections R⁹, R¹⁰, R¹¹ and R¹² would be connected directly to the negative main 27.

Figure 6:
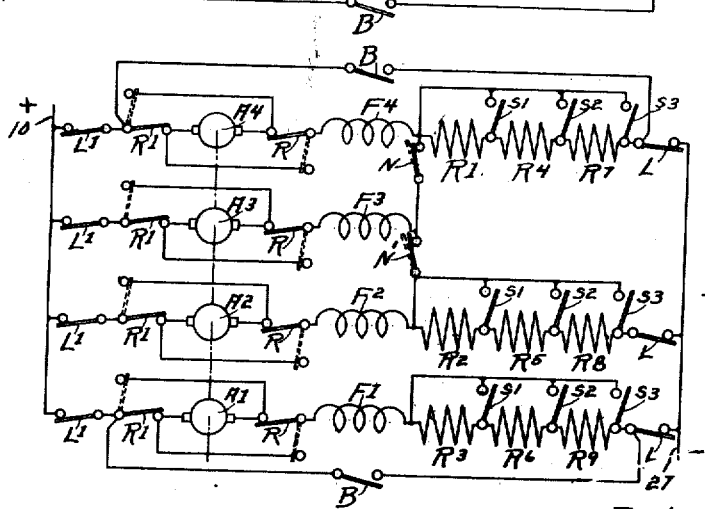

In the form of my invention shown in Fig. 6, four motors with reversing connections are employed, with three banks of resistance and dynamic braking connections for two of the motors. The operation is as follows: To start the motors in one direction, the switches B and the contacts $S^1$, $S^2$, $S^3$ are opened, and the switches L and $L^1$ are closed, and the reversing switches R and RR are closed in the solid line positions, for example. The current to the motor armature $A^1$ flows through the armature, the series field $F^1$ and the resistance sections $R^3$, $R^6$, $R^9$ in series therewith. The motors having armatures $A^2$, $A^3$, $A^4$, and the series fields $F^2$, $F^3$, $F^4$ are in parallel, and the current flowing through them divides between two resistance banks consisting respectively of the resistance sections $R^1$, $R^4$, $R^7$, and $R^2$, $R^5$, $R^8$. When the motors start, the contacts $S^1$, $S^2$, $S^3$ are closed successively to accelerate the motors. To stop the motors and start them in the other direction, the reversing switches are moved to the dotted line positions, giving current in the opposite direction to the motor armatures. The contactors $S^1$, $S^2$, $S^3$ are then closed successively to accelerate the motors in the other direction. To stop the motors by dynamic braking, the switches $L^1$, or $L^1$ and L are opened, and the switches B are closed, and the reversing switches R and RR are thrown to the reverse or dotted line position thus giving for each of the two outside motors an isolated dynamic braking circuit including an armature, a series field, and a resistance bank in series therewith. The contactors are then closed successively to cut out the resistance to maintain the braking effect. If desired, the switches L may be omitted; or by employing the two switches N and $N^1$ and the switches L, the switches $L^1$ may be omitted. When the switches $L^1$ are omitted, the reversing switches RR are connected directly to positive main 10, and when the switches L are omitted the resistance sections $R^7$, $R^8$, $R^9$ are connected directly to the negative main 27.

In these diagrams it will be seen that one set of contactors $S^1$, $S^2$, $S^3$ controls the starting and braking resistances for all of the motors; that the armature and series field of each individual motor are in series relation with each motor to properly distribute the load; that the dynamic braking circuit for each motor is segregated electrically from those of the others, so that local circulating currents which otherwise would tend to occur when the dynamic braking circuits are established, are entirely obviated; that during the period of stopping and reversing the motors, local circulating currents between any two motors flow through two banks of resistance sections in series, and are thus reduced to a safe amount; and that a complete rheostat for each motor is not essential since, as shown, there may be fewer rheostats than motors.

While I have shown the systems of Figs. 3, 4, 5, and 6 in simplified form only, it will be apparent that the detail features of the system shown in Fig. 1 may be applied to these systems. As for example, lock-open relays may be employed to actuate the contactors $S^1$, $S^2$, $S^3$ both during the acceleration of the motor and during the dynamic braking of the motor. It will also be apparent that in any of the systems shown, the lock-open relays may be dispensed with and the switches $S^1$, $S^2$, $S^3$ controlled only by the contact points, such as $f^2$, $f^3$, $f^4$ on the master M. My invention is not limited in its application to the systems of connections illustrated, since other arrangements, modifications, and combinations of the various essential features of my invention may be made without departing from its spirit.

I claim—

1. In a motor control system, current supply mains, a plurality of series motors arranged in parallel and having their rotary elements mechanically connected so as to rotate together, a plurality of banks of resistance sections for the motors, means for establishing dynamic braking circuits for some of the motors, a switch for cutting out simultaneously a resistance section from each bank to start the motors and for causing the said switch to cut out simultaneously a resistance section from each bank in each dynamic braking circuit, each resistance bank being connected across the supply mains and in series with some of the motors.

2. In a motor control system, current supply mains, a plurality of series motors arranged in parallel and having their rotary elements mechanically connected so as to rotate together, reversing switches for the motors, a plurality of banks of starting resistance sections, each section being connected across the supply mains and in series with some of the motors, and means whereby, upon the operation of the reversing switches to reverse the motors, the only electrical path from one motor to another will be in series with two banks of resistance sections.

3. In a motor control system, current supply mains, a plurality of series motors arranged in parallel and having their rotary elements mechanically connected so as to rotate together, reversing switches for the motors, a plurality of banks of starting resistance sections, each section being connected across the supply mains and in series with some of the motors, an accelerating switch for cutting out simultaneously a resistance section from each bank to start the motors, means for opening the accelerating switch to reinsert the starting resistance sections before the reversing switches may be operated to reverse the motors, and means whereby, upon the operation of the reversing switches to reverse the motors, the only electrical path from one motor to another will be in series with two banks of resistance sections.

4. In a motor control system, current supply mains, a plurality of series motors arranged in parallel and having their rotary elements mechanically connected so as to rotate together, reversing switches for the motors, a plurality of banks of starting resistance sections, each section being connected across the supply mains and in series with some of the motors, a dynamic braking circuit for one of the motors including one of the banks of resistance sections, and means whereby, when the dynamic braking circuit for said motor is closed, the current flowing in said motor is prevented from flowing in another motor.

5. In a motor control system, current supply mains, a plurality of series motors arranged in parallel and having their rotary elements mechanically connected so as to rotate together, reversing switches for the motors, a plurality of banks of starting resistance sections, each section being connected across the supply mains and in series with some of the motors, a dynamic braking circuit for one of the motors including one of the banks of resistance sections, means for establishing said dynamic braking circuits, a switch for cutting out simultaneously a resistance section from each bank to start the motors and for subsequently cutting out a section from one of the banks to stop one of the motors by dynamic braking, and means whereby, when the dynamic braking circuit for said motor is closed, the current flowing in said motor is prevented from flowing in another motor.

6. In a motor control system, current supply mains, a plurality of series motors arranged in parallel and having their rotary elements mechanically connected so as to rotate together, reversing switches for the motors, a plurality of banks of starting resistance sections, each section being connected across the supply mains and in series with some of the motors, a dynamic braking circuit for one of the motors including one of the banks of resistance sections, and means whereby, when the reversing switches operate to reverse the motors, or when the dynamic braking circuit is closed, current above a safe value is prevented from flowing from any motor to any other motor.

7. In a motor control system, current supply mains, a plurality of series motors arranged in parallel and having their rotary elements mechanically connected so as to rotate together, reversing switches for the motors, a plurality of banks of starting resistance sections, each section being connected across the supply mains and in series with some of the motors, a dynamic braking circuit for one of the motors including one of the banks of resistance sections, a switch for cutting out simultaneously a resistance section from each bank to start the motors and for subsequently cutting out a section from one of the banks to stop one of the motors by dynamic braking, means for opening the accelerating switch to reinsert the starting resistance sections before the reversing switches may be operated to reverse the motors and before the dynamic braking circuit may be closed, and means whereby, when the reversing switches operate to reverse the motors, or the dynamic braking circuit is closed, current above a safe value is prevented from flowing from any motor to any other motor.

Signed at Cleveland, Ohio, this 13th day of April, 1917.

REUBEN I. WRIGHT.